United States Patent
Bantle et al.

(10) Patent No.: US 9,358,624 B2
(45) Date of Patent: Jun. 7, 2016

(54) MOTOR-DRIVEN MACHINE TOOL

(75) Inventors: Florian Bantle, Gruibingen (DE); Hans Kaiser, Leuzigen (CH); Thilo Koeder, Gerlingen (DE); Joachim Platzer, Remseck-Hochberg (DE); Ulli Hoffmann, Niefem-Oeschelbronn (DE); Jan Koegel, Mount Prospect, IL (US); Marcel Casota, Zuchwil (CH)

(73) Assignee: Robert Bosch GmbH, Stuttgart (DE)

( * ) Notice: Subject to any disclaimer, the term of this patent is extended or adjusted under 35 U.S.C. 154(b) by 1228 days.

(21) Appl. No.: 13/143,230

(22) PCT Filed: Nov. 17, 2009

(86) PCT No.: PCT/EP2009/065309
§ 371 (c)(1),
(2), (4) Date: Jul. 5, 2011

(87) PCT Pub. No.: WO2010/076083
PCT Pub. Date: Jul. 8, 2010

(65) Prior Publication Data
US 2011/0265335 A1    Nov. 3, 2011

(30) Foreign Application Priority Data
Jan. 5, 2009    (DE) .......................... 10 2009 000 031

(51) Int. Cl.
*B23D 49/16*    (2006.01)
*B23D 51/02*    (2006.01)

(52) U.S. Cl.
CPC ............ *B23D 49/165* (2013.01); *B23D 49/167* (2013.01); *B23D 51/02* (2013.01)

(58) Field of Classification Search
CPC ..... B23D 49/165; B23D 49/167; B23D 51/02
USPC .................................................... 30/392–394
See application file for complete search history.

(56) References Cited

U.S. PATENT DOCUMENTS

| | | | | |
|---|---|---|---|---|
| 4,545,123 A * | 10/1985 | Hartmann | ...................... | 30/393 |
| 4,628,605 A * | 12/1986 | Clowers | ......................... | 30/393 |
| 8,201,337 B2 * | 6/2012 | Tam et al. | ...................... | 30/393 |
| 2004/0128843 A1 | 7/2004 | Walker | | |
| 2005/0257384 A1 * | 11/2005 | Million | .......................... | 30/392 |
| 2005/0257385 A1 | 11/2005 | Walker | | |
| 2006/0288592 A1 * | 12/2006 | Roberts | .......................... | 30/392 |
| 2007/0039191 A1 * | 2/2007 | Janutin et al. | .................. | 30/216 |
| 2007/0180711 A1 * | 8/2007 | Park | ................................ | 30/393 |
| 2007/0289149 A1 * | 12/2007 | Walker | ........................... | 30/393 |
| 2009/0077820 A1 * | 3/2009 | Gibbons et al. | ................. | 30/393 |
| 2011/0239473 A1 * | 10/2011 | Zurkirchen | ..................... | 30/392 |
| 2012/0030955 A1 * | 2/2012 | Kaiser et al. | .................... | 30/393 |
| 2013/0340261 A1 * | 12/2013 | Niwa et al. | ..................... | 30/124 |

FOREIGN PATENT DOCUMENTS

| | | |
|---|---|---|
| EP | 1598134 A1 | 11/2005 |
| GB | 2394692 A | 5/2004 |
| WO | 2009156210 A1 | 12/2009 |

* cited by examiner

*Primary Examiner* — Stephen Choi
*Assistant Examiner* — Fernando Ayala
(74) *Attorney, Agent, or Firm* — Maginot, Moore & Beck LLP

(57) ABSTRACT

For a machine tool designed in particular as a saber saw, a configuration including a carrying frame is provided, via which the lifting rod and the support element are joined to form a unit that can be rotated about the longitudinal axis of the power tool, is mounted on the casing side, and guides a drive part of the lift drive on the lifting rod side.

19 Claims, 4 Drawing Sheets

MOTOR-DRIVEN MACHINE TOOL

CROSS-REFERENCE TO RELATED APPLICATION

This application is a 35 USC 371 application of PCT/EP 2009/065309 filed on Nov. 17, 2009.

BACKGROUND OF THE INVENTION

1 Field of the Invention

The invention relates to a motor-driven power tool.

2 Description of the Prior Art

Motor-driven power tools of the above-mentioned type are known from DE 37 02 670 A1 and are complex in design. This results in a complicated structural embodiment and is accompanied by a certain susceptibility to malfunction, particularly under difficult working conditions. In addition, work options are partially limited because when the working tool is rotated around its longitudinal axis relative to the straight-ahead working direction, operating the power tool in orbital reciprocation mode is only possible at best to a limited degree.

OBJECT AND SUMMARY OF THE INVENTION

The object of the invention is to simplify the design of a motor-driven power tool of the type mentioned at the beginning, to provide it with a rugged embodiment, and in particular to also embody it so as to enable, as needed, an orbital reciprocation mode when the working plane of the working tool is rotated relative to the longitudinal axis out of its straight-ahead working direction, i.e. a "scrolling" working mode.

The starting point for the invention is the fact that the lifting rod and the supporting element are combined by means of a supporting frame to form a unit that is supported on the housing and is able to rotate around the longitudinal axis of the working tool, permitting the supporting element to maintain its position supporting the working tool in the working plane in all rotation positions of the working tool so that the support of the working tool by the supporting element is independent of the rotation position. It is thus possible to simplify the guidance for the lifting rod and to embody this guidance in the form of a sliding guide extending in the reciprocation direction, which is in turn supported on the supporting frame by means of a pivot axle extending transversely to the working plane.

If this support on the supporting frame is provided in the frame's end region oriented away from the working tool, it is then possible for the lifting rod, starting from the working tool or the holder for the working tool and extending through the support including the sliding guide, to be embodied as rigid and for the drive connection to the reciprocating drive to be integrated into the lifting rod close to the support, which results in a very compact design and also results in only small pivoting distances, particularly in the region of the drive connection to the reciprocating drive, when the working tool is being driven in orbital mode in the direction of the working plane, thus simplifying the embodiment of the drive connection.

Such a design permits the lifting rod to be used for executing the rotating drive for the supporting frame and therefore also for the working tool and the supporting element acting on it at the rear; the end of the lifting rod protruding beyond the supporting frame in the opposite direction from the working tool is connected to the corresponding rotating drive, which permits the use of conventional rotating drives without requiring further changes to the design. In the context of the invention, though, instead of introducing the rotary motion to the supporting frame indirectly via the lifting rod, it is also possible to use the rotary drive to act directly on the supporting frame, which is mounted on the housing in a way that permits it to rotate around the longitudinal axis of the working tool.

In the context of the invention, the reciprocating drive acting directly on the lifting rod is constituted by a crank mechanism embodied in the form of an eccentric drive and includes an eccentric pin, which is supported by a drive wheel mounted on the housing and engages in the guide slot of a slotted crank element; the slotted crank element extends transversely to the working plane of the working tool and the eccentric pin engages in the slot guide.

Preferably, the slotted crank element of the lifting rod is of one piece with the part of the lifting rod that is guided in the sliding guide in a rotationally fixed fashion in the direction of the longitudinal axis so that this part of the lifting rod can preferably be composed of flat stock, preferably embodied in the form of a stamped part. With a rigid attachment to the slotted crank element, the lifting rod, in its section extending from the slotted crank element to the tool holder, is suitably composed of round stock, in particular a rod-shaped round stock, making it possible to work with conventional tool holders.

Because the supporting frame is mounted so that it is able to rotate around the longitudinal axis of the working tool, depending on the specific rotation position, different angular positions are produced between the eccentric pin and the extension plane of the slotted crank element with its slot guide. The resulting friction conditions can be favorably controlled because the eccentric pin is supported by means of a needle bearing at least in the overlap region with the slot guide; the axial movement of the eccentric pin relative to the slotted crank element is relatively slight anyway due to the fact that the rotatability of the working tool is limited to a pivot angle on the order of +/−30°.

The supporting element is supported relative to the supporting frame by means of a pivot axle oriented transversely to the working plane on downward-protruding support legs provided on the cage-like supporting frame; the supporting element is preferably embodied in the form of an angle lever that is provided with an adjusting sector protruding toward its leg oriented away from the working tool, which adjusting sector lies within the permissible rotation range of the supporting frame in the overlap region with the adjusting element that is movable in the axial direction—preferably parallel to the longitudinal axis—and is acted on by the adjusting drive for the orbital motion of the working tool.

Other advantages and advantageous embodiments ensue from the claims, the description of the drawings, and the drawings themselves.

BRIEF DESCRITION OF THE DRAWINGS

DESCRIPTION OF THE PREFERRED EMBODIMENT

Figure 1:
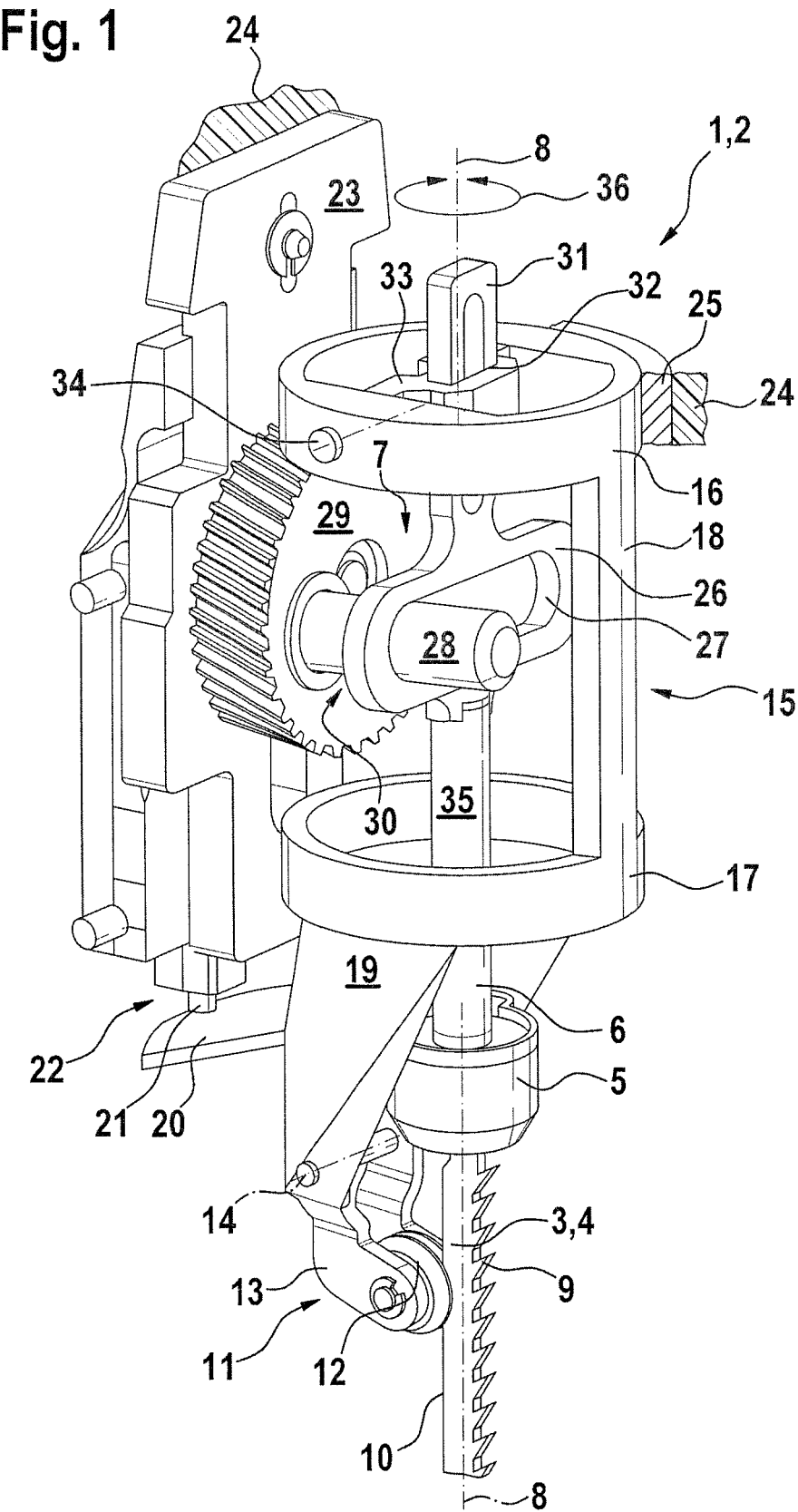
FIG. 1 is a perspective, schematic overview of a power tool according to the invention, embodied in the form of a jigsaw, reduced to the parts essential to comprehension of the invention and in particular, largely without housing parts.
Figure 2:
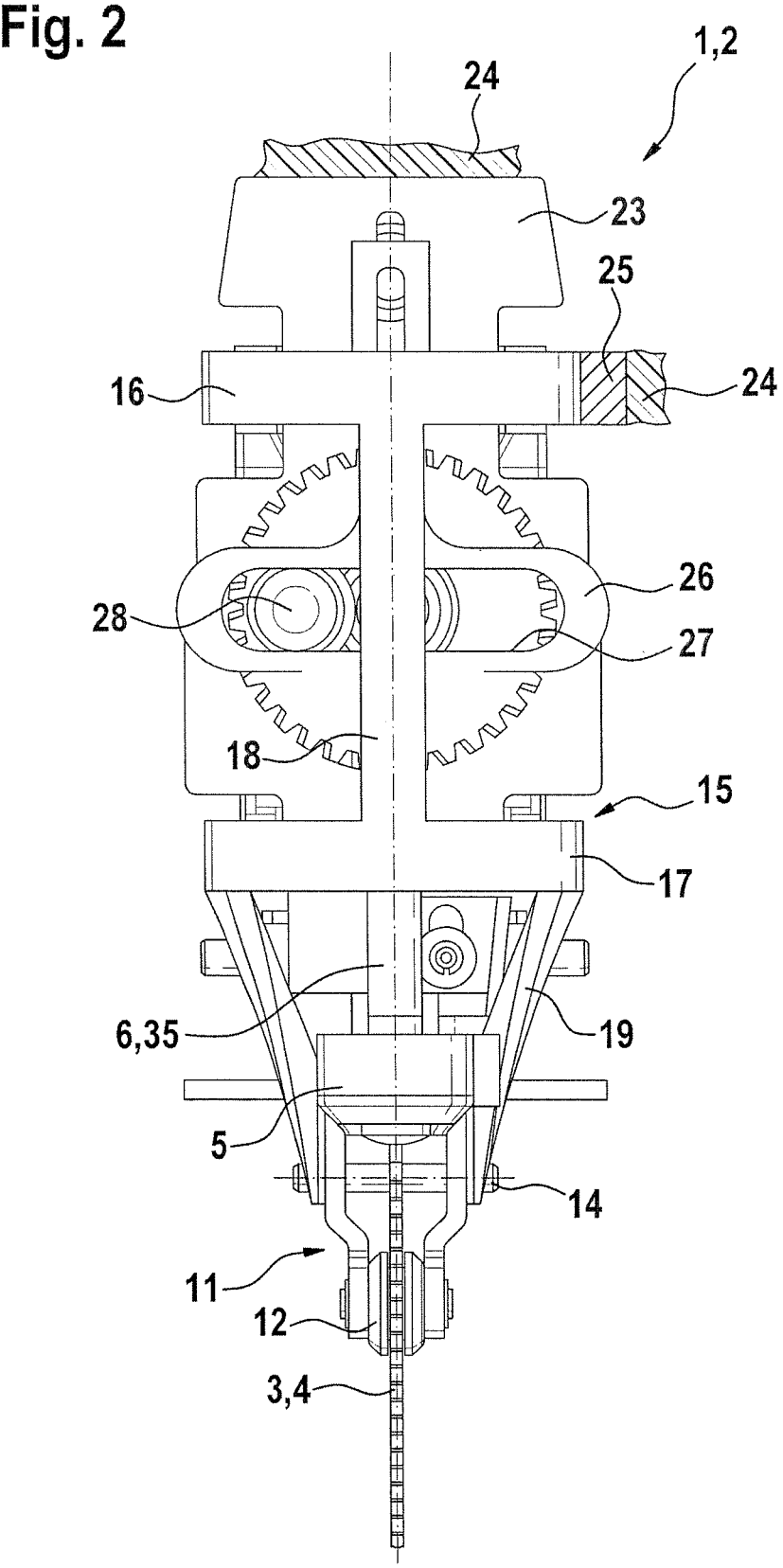
FIGS. 2 shows a partially simplified depiction of the power tool from FIG. 1 in a front view.
Figure 3:
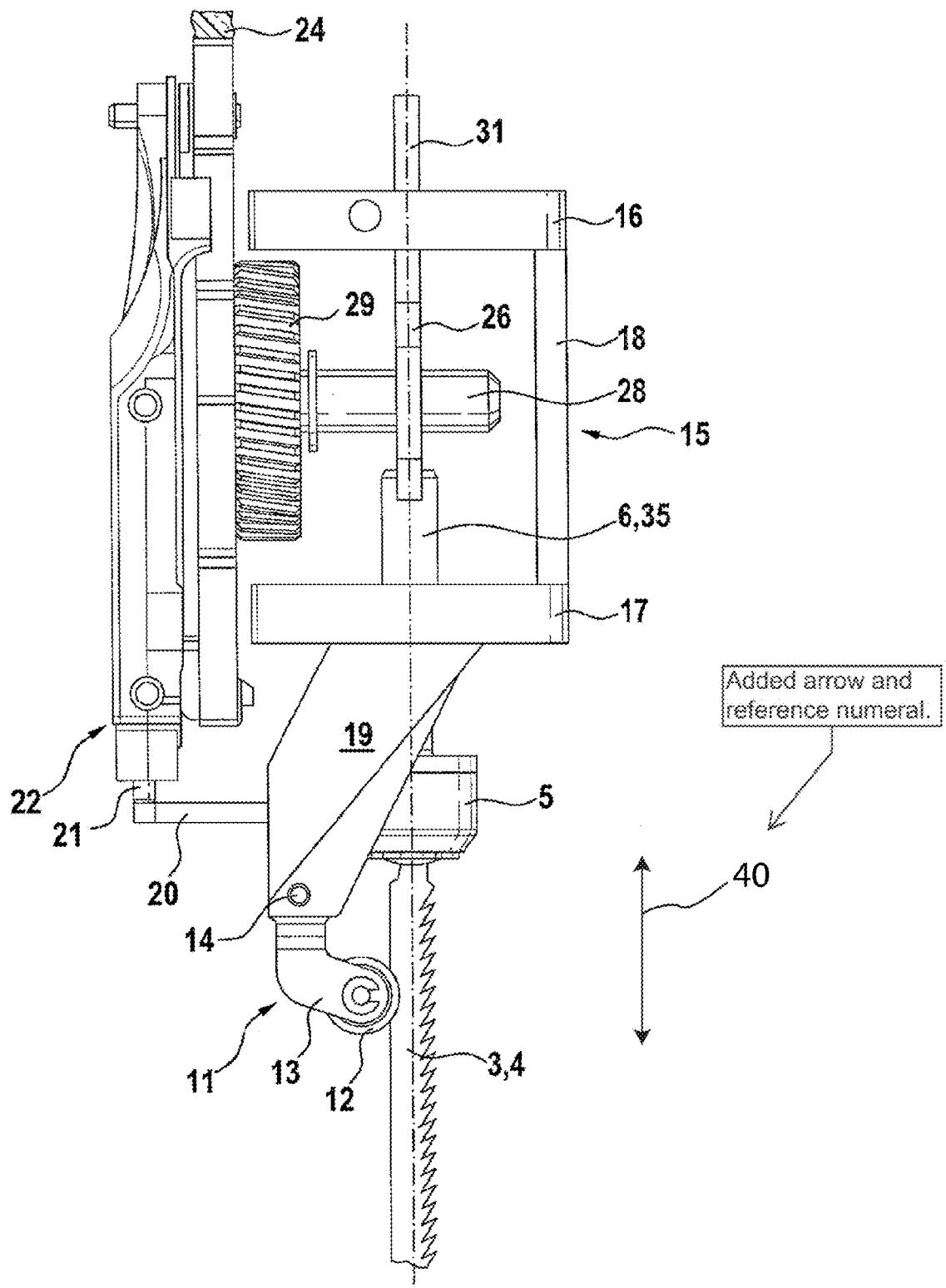
FIG. 3 shows a partially simplified depiction of the power tool from FIG. 1 in a side view.
Figure 4:
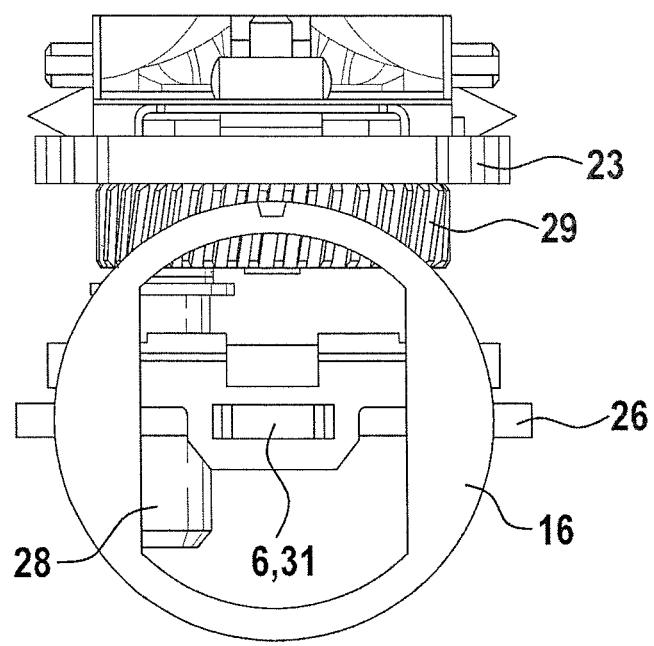
FIG. 4 shows a partially simplified depiction of the power tool from FIG. 1 in a top view.

The power tool 1 shown in the figures is embodied in the form of a jigsaw 2 whose working tool 3 is constituted by a saw blade 4 that is driven to execute a reciprocating motion along a direction of axial movement 40 defined by an longitudinal axis 8 of the working tool 3. The saw blade 4 is attached via a saw blade holder 5 to a lifting rod 6 that is acted on by a reciprocating drive 7.

The saw blade 4 provided as the working tool 3 has a longitudinal axis 8 lying in the working plane of the saw blade 4, which has a set of teeth 9 in front and whose opposing saw blade spine 10 is supported against a supporting element 11 by means of a supporting roller 12. The supporting element 11 is embodied in the form of a pivot lever 13, which is linked to a supporting frame 15 by means of a pivot axle 14. With a cage-like embodiment, the supporting frame 15 has a support ring 16, which is situated at the upper end in the drawing and oriented away from the working tool 3, and has a lower support ring 17; these rings are connected to each other in stationary fashion by means of a longitudinal strut 18 depicted in the form of a longitudinal bar. From the support ring at the lower end in the drawing, support legs 19 protrude downward, with the pivot axle 14 passing through them. Protruding from the rear toward the arms of the angular supporting element 11 extending upward in the drawing, a plate-shaped adjusting sector 20 is provided, which is acted on by the adjusting element 21 of a stationarily mounted adjusting drive 22 provided for the orbital drive. The latter is not depicted in detail and is situated behind a support plate 23 mounted in stationary fashion relative to the housing of the power tool 1 and therefore on the opposite side from the working tool 3 provided at the front along with its devices provided for the reciprocating and/or rotary drive. The supporting frame 15 is supported via at least one of its support rings 16, 17 in rotary fashion relative to the housing 24, which is depicted only schematically, by means of a bearing that is symbolically depicted by means of a bearing 25 that is supported relative to the upper support ring 16.

The lifting rod 6 extends axially through the supporting frame 15 and its upper section adjacent to the upper support ring 16 preferably includes the lifting rod drive part of the reciprocating drive 7, which as a slotted crank element 26, is equipped with a slot guide 27 extending transversely to the working plane, in which an eccentric pin 28 engages, which is provided on a drive wheel 29 of the crank mechanism 30 embodied in the form of an eccentric drive and is part of the reciprocating drive 7.

In the opposite direction from the working tool 3, adjoining the slotted crank element 26, the lifting rod 6 continues in a section 31 through which passes a sliding guide 32 that is a component of a strut 33, which extends transversely to the working plane and is supported in rotatable fashion relative to the upper support ring 16 by means of a pivot axle 34 likewise extending transversely to the working plane.

The section 31 of the lifting rod 6 including the slotted crank element 26 is connected to the strut 33 by the sliding guide 32 in a fashion that is rotationally fixed, but permits it to move in the direction of the longitudinal axis 8; the strut 33 in turn is able to pivot around the pivot axle 34 so that for the lifting rod 6, which constitutes a continuous, rigid unit over its entire length, a pivoting support is produced, around whose pivot axle 34 the lifting rod 6 with the saw blade 4 provided in its extension can be moved in orbital fashion by means of the supporting element 11 when acted on by the adjusting drive 22.

The upper section 31 of the lifting rod 6 that includes the slotted crank element 26 is preferably composed of flat stock and can therefore also be inexpensively embodied in the form of a stamped part and toward the bottom, transitions into a rod part 35 with a round cross section that is connected to the slotted crank element 26 in stationary fashion and is provided with the saw blade holder 5.

The above-explained design once again offers the possibility of providing the lower support ring 17 with a sliding guidance for the lifting rod 6 in the direction of its working plane so that a transverse guidance for the lifting rod 6 is also provided in the region of the lower support ring 17. For example, this can be achieved by means of a base for the lower support ring 17 that is provided with a corresponding oblong hole-shaped recess that accommodates the rod part 35 of the lifting rod 6 in a guiding fashion.

In the above-explained embodiment, the supporting frame 15 constitutes the rotationally fixed sliding guidance for the lifting rod 6 and supporting element 11 and, through the integration of the slotted crank element 26 into the lifting rod 6, also constitutes the rotationally fixed guidance for the slotted crank element 26 relative to the supporting frame 15 so that with a rotational movement of the supporting frame 15, a synchronous movement of these parts occurs. The rotational movement, which is not shown, can take place directly through a rotary drive engaging the supporting frame 15 or also indirectly through a rotary drive engaging the lifting rod 6, in particular its section 31.

With regard to the angular position of the slotted crank element 26 relative to the eccentric pin 28 that changes when the supporting frame 15 is rotated around the longitudinal axis 8 and the resulting sliding movements, it turns out to be advantageous for the eccentric pin 28 to be supported in the slot guide 27 by means of a needle bearing or also optionally for it to be at least partially embodied in the form of a needle bearing.

The above-explained design of the jigsaw 2 results in a very compact, rugged embodiment in which the working tool in the form of the saw blade is supported in the respective working plane by the supporting element 11 in all rotation positions so that even in rotation positions that differ from the straight-ahead working direction, the saw blade 4 is supported by the supporting element II in the working plane as a result of which, the saw blade 2 can also be operated in so-called scrolling mode, i.e. can be operated as a scrolling jigsaw with an orbital action in addition to the reciprocating drive, with a saw blade 4 that is pivotable in the direction of the saw blade plane. The rotary drive for the lifting rod 6 is symbolically depicted by means of an arrow and is labeled with the reference numeral 36, which also depicts a direction of rotary movement about the longitudinal axis 8 of the working tool 3.

The foregoing relates to the preferred exemplary embodiment of the invention, it being understood that other variants and embodiments thereof are possible within the spirit and scope of the invention, the latter being defined by the appended claims.

The invention claimed is:

1. A motor-driven power tool, comprising:
   a housing;
   a working tool defining a longitudinal axis and a working plane containing the longitudinal axis, the working tool being movable in rotary fashion about the longitudinal axis and being axially movable in a direction of the longitudinal axis;
   a reciprocating drive including a lifting rod, the working tool being operatively connected to the lifting rod, and the reciprocating drive being configured to axially move the lifting rod and the working tool in the direction of the longitudinal axis;

a supporting element configured to act on the working tool in a direction of the working plane at a rear of the working tool; and a supporting frame rotatably supported by the housing and configured to support the lifting rod and the supporting element, wherein the supporting frame, the lifting rod and the supporting element are rotatable about the longitudinal axis of the working tool, and the supporting frame is configured to guide a drive part of the lifting rod, wherein the lifting rod is configured to pivot relative to the supporting frame when the supporting element acts on the working tool, and wherein the supporting frame is embodied in the form of a cage with an upper and lower support ring, which rings are connected to each other in stationary fashion by a longitudinal strut, with the upper support ring accommodating a pivot axle for the lifting rod and the lower support ring having support legs protruding in a direction toward the working tool on which the supporting element is supported.

2. The power tool according to claim 1, wherein the supporting element is able to pivot relative to the supporting frame about an axle extending transversely to the working plane and is movable in an orbital fashion via an adjusting drive.

3. The power tool according to claim 1, wherein the supporting element is driven so that it is able to rotate about the longitudinal axis of the working tool.

4. The power tool according to claim 2, wherein the supporting element is driven so that it is able to rotate about the longitudinal axis of the working tool.

5. The power tool according to claim 3, wherein a rotary drive that engages the supporting frame is provided in order to move the supporting frame in a rotary fashion.

6. The power tool according to claim 4, wherein a rotary drive that engages the supporting frame is provided in order to move the supporting frame in a rotary fashion.

7. The power tool according to claim 3, wherein:
the lifting rod is rotatable about the longitudinal axis by a rotary drive structure, and
the supporting frame is connected to the lifting rod in a rotationally fixed manner.

8. The power tool according to claim 4, wherein:
the lifting rod is rotatable about the longitudinal axis by a rotary drive structure, and
the supporting frame is connected to the lifting rod in a rotationally fixed manner.

9. The power tool according to claim 7, wherein:
the lifting rod is configured to execute a reciprocating motion,
the lifting rod is rotationally fixed relative to the supporting frame, and
the pivot axle extends transversely to the working plane.

10. The power tool according to claim 8, wherein:
the lifting rod is configured to execute a reciprocating motion,
the lifting rod is rotationally fixed relative to the supporting frame, and
the pivot axle extends transversely to the working plane.

11. The power tool according to claim 1, wherein the reciprocating drive includes a Scotch-yoke mechanism with the drive part embodied as a slotted crank element that is connected to the lifting rod in stationary fashion and extends transversely to the lifting rod.

12. The power tool according to claim 11, wherein the slotted crank element has a slot guide that extends transversely to the working plane and is engaged by an eccentric pin that is provided on a drive wheel of the crank mechanism embodied as an eccentric drive.

13. The power tool according to claim 12, wherein the eccentric pin is supported relative to the slot guide by a needle bearing, such that a part of the eccentric pin that engages with the slot guide is embodied as the needle bearing.

14. The power tool according to claim 2, wherein the supporting element includes a pivot lever having an adjusting sector configured to protrude in the opposite direction from the working tool and is situated in an overlap region with a drive element of the adjusting drive that is connected to the housing in stationary fashion.

15. The power tool according to claim 14, wherein the drive element of the adjusting drive constitutes an orbital drive and is embodied in the form of an adjusting element configured to act on the adjusting sector and is able to execute a reciprocating motion parallel to the longitudinal axis.

16. The power tool according to claim 1, wherein the supporting frame is rotatably supported on the housing by the upper support ring.

17. The power tool according to claim 2, wherein the power tool has a support plate, one side of which is provided with the adjusting drive and the other side of which is provided with the reciprocating drive of the working tool with its associated supporting frame.

18. The power tool according to claim 1, wherein the power tool is embodied in the form of a jigsaw with a saw blade as the working tool.

19. The power tool according to claim 13, wherein the power tool is embodied in the form of a jigsaw with a saw blade as the working tool.

* * * * *